US 8,218,780 B2

(12) United States Patent
Baran et al.

(10) Patent No.: US 8,218,780 B2
(45) Date of Patent: Jul. 10, 2012

(54) METHODS AND SYSTEMS FOR BLIND DEREVERBERATION

(75) Inventors: Thomas Anthony Baran, Cambridge, MA (US); Bowon Lee, Mountain View, CA (US); Ronald W. Schafer, Mountain View, CA (US); Majid Fozunbal, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 488 days.

(21) Appl. No.: 12/484,686

(22) Filed: Jun. 15, 2009

(65) Prior Publication Data
US 2010/0316228 A1 Dec. 16, 2010

(51) Int. Cl.
*H04B 3/20* (2006.01)
*H03G 3/00* (2006.01)

(52) U.S. Cl. ............................. 381/66; 381/63

(58) Field of Classification Search ............ 381/94.2, 381/66, 62, 63, 71.1, 71.4, 94.7, 94.1, 94.3; 379/406.06, 406.12, 406.13, 406.14
See application file for complete search history.

(56) References Cited

U.S. PATENT DOCUMENTS

| | | | | |
|---|---|---|---|---|
| 5,774,562 A | * | 6/1998 | Furuya et al. | 381/66 |
| 2005/0058301 A1 | * | 3/2005 | Brown | 381/94.2 |

OTHER PUBLICATIONS

Author: Yoshioka et al. Tittle: Maximum likelihood approach to speech enhancement for noisy reverberant signals. Date: 2008. Publisher: IEEE. pp. 4585-4588.*
Author: Furuya et al. Tittle: Robust speech dereverberation using multichannel blind deconvolution with spectral subtraction. Date: Jul. 2007. Publisher: IEEE. vol. 15, No. 5. pp. 1579-1591.*
Author: Kinoshita et al. Tittle: A new audio post-production tool for speech dereverberation. Date: Oct. 2008. Publisher: Audio Engineering Society.*

* cited by examiner

*Primary Examiner* — Devona Faulk
*Assistant Examiner* — David Ton

(57) ABSTRACT

Various embodiments of the present invention are directed to methods for dereverberation of audio generated in a room. In one aspect, a method for dereverberating reverberant digital signals comprises transforming a reverberant digital signal from the time domain into Fourier domain signals using a computing device, each Fourier domain signal corresponding to a subband. For each subband of the Fourier domain signal, the method computes autoregressive model coefficients of the reverberation with the current and previous magnitudes of the Fourier digital signal, and inverse filters the magnitude of the Fourier domain signal using the computing device, based on the autoregressive model coefficients and previous magnitudes of the Fourier digital signal. The method includes inverse transforming the Fourier domain signals with filtered magnitudes into an approximate dereverberated digital signal.

9 Claims, 6 Drawing Sheets

METHODS AND SYSTEMS FOR BLIND DEREVERBERATION

TECHNICAL FIELD

Embodiments of the present invention relate to audio signal processing, and, in particular, to methods and systems for estimating and reducing the effects of reverberation in audio signals in multimedia communications.

BACKGROUND

In hands-free voice communication systems, sound captured by a microphone may include background noise and reverberation, resulting in a degradation of the quality of speech. The distortion is detrimental to both perceived speech quality as well as to the performance of speech processing algorithms, such as automatic speech recognition systems, that are primarily designed for clean speech signals. Typical background noise is additive in nature and may be reduced by exploiting its uncorrelatedness with speech. Reverberation, however, results from convolution of the room impulse response with the signal, and is thus highly correlated with the speech signal. Moreover, the problem of dereverberation is blind because of limited knowledge about the speech source as well as the reverberation impulse response. Dereverberation methods typically require prior knowledge of, or at least a model for, either the speech or the reverberation impulse response.

Existing methods often address dereverberation as an inverse filtering problem by assuming that the room impulse response, is known a priori. Unfortunately, inverse filtering methods cannot achieve perfect reconstruction of the signal for the following reasons. First, the room impulse response is seldom known a priori, and in practice the reverberation in a room depends on many factors, including the number of people present, humidity and temperature, all of which are time-varying. Second, the room response is rarely minimum-phase and is consequently not invertible by inverse linear filtering.

Another approach for dereverberation exploits prior knowledge of the structure of speech and includes the use of linear prediction and harmonic structure analysis. However, these techniques typically require a large amount of reverberant speech for training and may suffer degraded performance for unvoiced speech and non-speech sources.

Dereverberation methods that assume only general knowledge of the nature of the room impulse response and only general knowledge of the structure of the speech signal are desired.

DETAILED DESCRIPTION

Various embodiments of the present invention are directed to methods for dereverberation of audio generated in a room. In particular, method embodiments address the dereverberation problem by modeling reverberation as a first-order autoregressive model in the magnitude of the short-time frequency domain. This is well-motivated by knowledge of the human perception of sound. Methods of the present invention are approximate and invertible. In particular, the inverse filters used are causal and stable, and they model the tail of the reverberation impulse response well. This is important since long reverberation times are particularly deleterious to speech quality and intelligibility. Method embodiments may therefore be well-suited for use in conjunction with a multichannel beamformer, which complement methods of the present invention by reducing early reflections that are directional in nature. Dereverberation methods of the present invention model the effects of the reverberation, as opposed to modeling the characteristics of speech, and consequently can be applied to non-speech signals, such as polyphonic music. The determination of the model parameters and the inverse filtering process can be performed in a computationally efficient manner, leading to low-latency, real-time implementations.

A. Reverberation

Figure 1:
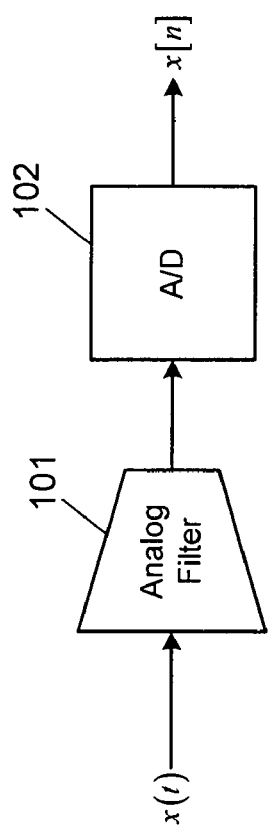
FIG. 1 shows generating a digital source signal from an analog signal.

Method embodiments of the present invention are described below with reference to digital signals. A digital source signal represented by $x[n]=x(nT)$ is a sampled version of an analog signal $x(t)$, and the value of $x[n]$ is obtained at fixed time intervals (e.g., $T=\frac{1}{48}$ ms) rather than continuously, where t represents continuous time and n is an integer that represents a time index. The digital source signal $x[n]$ can be obtained, as shown in FIG. 1, by passing an analog signal $x(t)$ generated at a microphone through an analog filter 101 followed by converting the analog signal into a digital signal using an analog-to-digital ("A/D") converter 102. The analog filter 101 prevents frequency-aliasing at the analog-to-digital converter 102, which samples the analog signal $x(t)$ at discrete time intervals and quantizes the amplitude to obtain the digital signal $x[n]$. The effects of sample quantization can be neglected if the A/D converter 102 has at least 16 bits of amplitude resolution.

Figure 2:
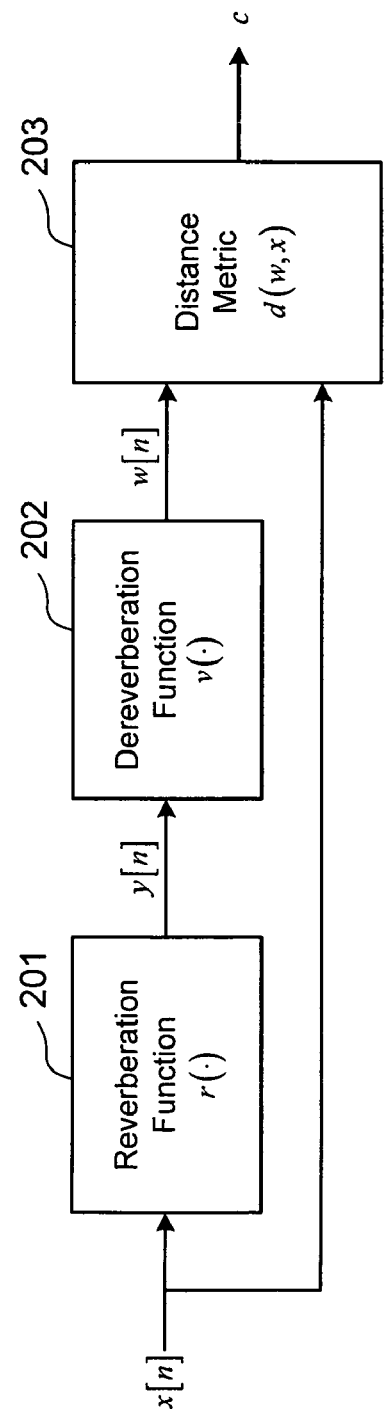
FIG. 2 shows a general schematic representation of the dereverberation problem.

FIG. 2 shows a general schematic representation of the dereverberation problem. In a general formulation of dereverberation in the noise-free case, the digital source signal $x[n]$ is affected by a possibly nonlinear and generally stochastic reverberation operator $r(\cdot)$ 201, resulting in a reverberant signal $$y[n]=r(x)[n]$$

A dereverberation method conceptually designs an operator $v(\cdot)$ 202 for processing $y[n]$ so that the processed digital signal is close to the digital source signal in some sense, i.e., $$w[n]=v(y)[n]\approx x[n]$$

where $w[n]$ is referred to as an approximate dereverberated digital signal. In particular, when $r(\cdot)$ is known and invertible, then an inverse filter $v(\cdot)=r^{-1}(\cdot)$ can be constructed such that $$w[n]=v(y)[n]=r^{-1}(r(x))[n]=x[n]$$

Unfortunately, perfect reconstruction of the signal x[n] cannot be achieved with the inverse filtering method due to the fact that r(•) is seldom known a priori and that r(•) is, in fact, rarely invertible. Existing dereverberation methods therefore attempt to invert r(•) by designing a v(•) that results in an approximation w[n] that is close to x[n].

The particular sense in which w[n] is close to x[n] can be determined by a distance metric d(•,•) 203 such that $$c=d(w,x)\approx 0, \text{ for } w[n]\approx x[n]$$

A good dereverberation algorithm prescribes a v(•) so that c is small for a wide range of x[n] and r(•) encountered in practice.

For evaluating dereverberation performance, conventional methods choose a d(•,•) such as mean-squared error that measures the similarity between the magnitudes of the short-time Fourier transform ("STFT") of x[n] and w[n]. Instead, methods of the present invention were developed and evaluated using quality assessment tools designed to emulate subjective test scores, such as the perceptual evaluation of speech quality ("PESQ") tool.

B. Method Embodiments

The methods of the present invention are carried out in the STFT domain because this domain is closely tied to human perception. Specifically, the magnitude of the STFT of the reverberant signal y[n] is used to estimate the magnitude of the STFT of the original speech signal x[n]. This estimated magnitude then serves as the basis for synthesizing a dereverberated time-domain signal w[n], whose STFT phase is taken from the STFT of the input signal y[n].

In general, the STFT of a signal denoted x[n] is interpreted as the time-series outputs from a modulated filter bank that analyzes x[n]. The output of a single filter in the filter bank is $$X_k[r] = \sum_{m=-\infty}^{\infty} g[r-m]x[r]\exp\left(-j\frac{2\pi}{N}km\right)$$

where $X_k[r]$ represents the output at time index r from the k-th filter analyzing x[n], and g[n] is a Hanning prototype filter for the filter bank, and k is an integer satisfying $0 \leq k \leq N-1$. The ensemble of the magnitudes of the critically sampled filter bank outputs $|X_k[Nr]|$, with N denoting the number of subbands, comprise the STFT magnitude.

In general, the inverse of the STFT is interpreted as the output from a synthesis filter bank given by $$x[n] \equiv \sum_{r=-\infty}^{\infty} \frac{1}{N} \sum_{k=0}^{N-1} X_k[r]\exp\left(j\frac{2\pi}{N}kn\right)$$

where $$X_k[r] = |X_k[r]|\exp(j\arg(X_k[r]))$$

In estimating the STFT magnitude of the original speech signal from the STFT magnitude of the reverberant signal, the magnitudes of the outputs of each of the N filters in the filter bank are processed by one of N independent, adaptive subsystems that are identical in construction (although their internal parameters may in general converge to different values, as described in greater detail below with reference to FIG. 3. The STFT magnitude $|X_k[r]|$ of the original, unreverberated audio signal x[n] is estimated by performing independent autoregressive modeling of $|Y_k[Nr]|$ for each filter output k, followed by inverse-filtering of the $|Y_k[Nr]|$ using the respective model parameters. Considering the STFT at times Nr is, in effect, sampling $Y_k$ at the lowest rate that would allow reconstruction. In this case, each block of N samples would be represented by N STFT values. This condition is called critical sampling.

B.1 Assumptions

A number of assumptions underlying dereverberation method embodiments of the present invention include:

1. The reverberation function r(•) is modeled in the STFT domain as convolving the magnitudes of the filter bank outputs $|X_k[Nr]|$ with individual kernels $H_k[r]$, i.e., $$|Y_k[N_r]| = \sum_{l=0}^{\infty} |X_k[N(r-l)]|H_k[l]$$

where $H_k[r]$ is characterized by:

$$H_k[r] = u[r]a_k^r \text{ with } 0 \leq a_k < 1$$

and $$u[r] = \begin{cases} 1 \text{ for } r \geq 0 \\ 0 \text{ for } r < 0 \end{cases}$$

and $a_k$ is called the "autoregressive model coefficient."

2. $|X_k[Nr]|$ is characterized by the following statistics:

$$E[|X_k[Nr]|] = \mu_{|X_k|}$$

$$E[(|X_k[Nr]| - \mu_{|X_k|})(|X_k[N(r+m)]| - \mu_{|X_k|})] = \sigma_{|X_k|}\delta[m]$$

That is $|X_k[Nr]|$ the STFT magnitude for channel k as a function of time index r is assumed to be a white noise sequence. In other words, blocks of N samples of the input are assumed to be independent.

These assumptions are consistent with analyzing room impulse responses sampled at 48 kHz using $N \geq 4096$. Method embodiments first determine the model parameters $a_k$ by solving N first-order autocovariance normal equations, and perform inverse-filtering in r on each of the $|Y_k[Nr]|$ to obtain the magnitudes of a set of signals $|W_k[Nr]|$ that are estimates of the magnitudes of the $|X_k[Nr]|$. Next, the phases of the $|W_k[Nr]|$ are taken from the phases of $|Y_k[Nr]|$.

Note that the assumption that $|X_k[Nr]|$ is white, which underlies the use of the first-order autocovariance normal equation in determining the $a_k$, is closely related to the fact that the filter bank analysis and synthesis are critically sampled, as described below. Although not a necessary condition for this assumption, a sufficient condition is that the $|X_k[Nr]|$ are zero-mean, wide-sense stationary, and Gaussian.

B.2 Method Stages

Although operating on the critically sampled outputs of the filter bank $Y_k$ leads to a straightforward inverse-filtering problem, there are additional considerations to be made in practice. The first is that in inverse filtering the magnitudes of the outputs from the analysis filter bank to obtain the magnitudes of the inputs to the synthesis filter bank, it is possible for negative values to be generated. These may be present when the actual behavior of the STFT magnitude $|Y_k[Nr]|$ deviates strongly from the above assumptions. This issue is resolved by using as the magnitude of a particular input to the synthesis bank the maximum of 0 and the inverse-filtered magnitude (i.e., the STFT magnitude signals are half-wave rectified).

Another consideration arises from our formulation of the algorithm in terms of the critically sampled $Y_k$. While having critically-sampled filter outputs results in methods that are amenable to analysis using an autoregressive model, implementing methods of the present invention using critically sampled $Y_k$ causes abrupt discontinuities in the output w[n], even if the magnitudes of the short-time spectral coefficients are perfectly inverted. The problem is characteristic of many methods that perform nonlinear modifications to the STFT. This issue is resolved by determining the model parameters $a_k$ using the critically sampled Fourier domain signals $|Y_k[Nr]|$, but inverse filtering is carried out on Fourier domain signals that are sampled at M times the critical rate, i.e. $|Y_k[Nr/M]|$, where N is restricted to being an integer multiple of M.

The overall method embodiments of the present invention consists of the following stages:

1. From y[n], compute $Y_k[Nr/M]$ and define $$\hat{Y}_k[r] = |Y_k[Nr/M]| \quad \text{Equation (1)}$$

2. Estimate the autoregressive model coefficient $a_k$ using the first-order autocovariance normal equations on each of the centered filter bank magnitude series, i.e.

$$a_k = \frac{E\left[(\hat{Y}_k[r] - \mu_{\hat{Y}_k})(\hat{Y}_k[r-M] - \mu_{\hat{Y}_k})\right]}{E\left[(\hat{Y}_k[r] - \mu_{\hat{Y}_k})^2\right]} \quad \text{Equation (2)}$$

where $\mu_{\hat{Y}_k} = E[\hat{Y}_k]$ and $E[\bullet]$ represents the expectation (or averaging) operator.

3. Perform inverse filtering on the $\hat{Y}_k[r]$:

$$\hat{W}_k[r] = \hat{Y}_k[r] - a_k \hat{Y}_k[r-M] \quad \text{Equation (3)}$$

4. Form the short-time Fourier transform $W_k[Nr/M]$ using $$\arg(W_k[Nr/M]) = \arg(Y_k[Nr/M]), \text{ and} \quad \text{Equation (4)}$$

$$|W_k[Nr/M]| = \max(0, \hat{W}_k[r]) \quad \text{Equation (5)}$$

Note that for the first-order model, autoregressive model coefficient $a_k$ is simply equal to the normalized autocovariance at lag 1 on the critical sampled time scale. However, the autocovariance of $|Y_k[Nr]|$ at lag 1 is equivalent to the autocovariance of $|Y_k[Nr/M]|$ at lag M, and it should be noted that the former may consequently be used in place of the latter. The averages for computing $a_k$ may be estimated using appropriately normalized exponentially weighted sums of previous signal values. In practice, an estimate of $a_k$ that is allowed to vary slowly with time is used and computed according to the following stages:

1. Estimate the $\mu_{\hat{Y}_k}$:

$$\hat{\mu}_{\hat{Y}_k}[r] = \alpha \hat{\mu}_{\hat{Y}_k}[r-1] + (1-\alpha)\hat{Y}_k[r], \quad \text{Equation (6)}$$

Where $\alpha$ determines the rate at which the estimates are allowed to adapt.

2. Estimate the numerator and denominator in Equation (1) as:

$$\hat{a}_k^{(num)}[r] = \alpha \hat{a}_k^{(num)}[r-1] + (1-\alpha)(\hat{Y}_k[r] - \hat{\mu}_{\hat{Y}_k}[r])(\hat{Y}_k[r-M] - \hat{\mu}_{\hat{Y}_k}[r]) \quad \text{Equation (7a)}$$

$$\hat{a}_k^{(den)}[r] = \alpha \hat{a}_k^{(den)}[r-1] + (1-\alpha)(\hat{Y}_k[r] - \hat{\mu}_{\hat{Y}_k}[r])^2 \quad \text{Equation (7b)}$$

again $\alpha$ determines the adaptation rate.

3. Compute the time-varying estimate of the autoregressive model coefficients $a_k$ as follows:

$$\hat{a}_k[r] = \frac{\hat{a}_k^{(num)}[r]}{\hat{a}_k^{(den)}[r]} \quad \text{Equation (8)}$$

The above discussion is based on a first-order autoregressive model, which uses only a single normalized autocovariance value as in Equation (8). This model is effective for real-time operation. However, a higher order autoregressive model can also be used, which may require higher computational complexity due to the estimation of additional autocovariance values and the inversion of a matrix to obtain the additional prediction coefficients.

B.3 Implementation

Figure 3:
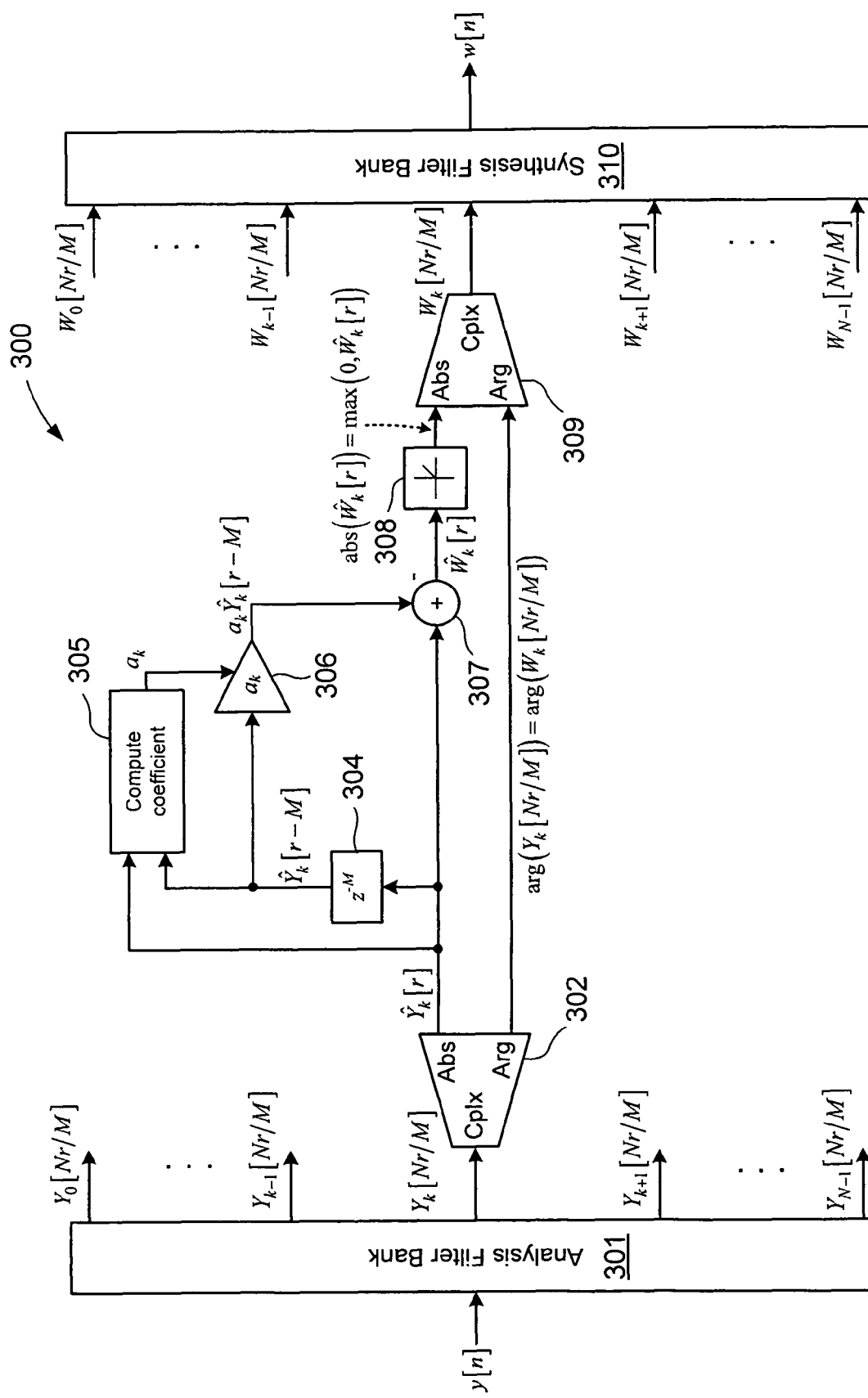
FIG. 3 shows a schematic representation of processes performed by a dereverberation system operated in accordance with embodiments of the present invention.

FIG. 3 shows a schematic representation of processes performed by a dereverberation system 300 operated in accordance with embodiments of the present invention. Digital reverberant signals y[n] are input to an analysis filter bank 301. The analysis filter bank 301 performs a STFT on the reverberant digital signal y[n] to obtain the Fourier domain signal $Y_k[Nr/M]$ for each subband k, with N restricted to an integer multiple of M, as described above. The STFT can be performed using a Hanning-windowed Fast-Fourier Transform ("FFT") with window overlaps corresponding to M. As shown in the example of FIG. 3, each subband k output from the analysis filter 301 is processed separately in accordance with stages 302-309 as follows. Each of the $Y_k[Nr/M]$ output from the analysis filter 301 is a complex number. At stage 302, the STFT signal output from the kth filter $Y_k[Nr/M]$ is converted into polar form giving:

$$Y_k[Nr/M] = \hat{Y}_k[r]\exp(j\arg(\hat{Y}_k[r]))$$

where the magnitude $\hat{Y}_k[r] = |Y_k[Nr/M]|$ and argument $\arg(\hat{Y}_k[r]) = \arg(\hat{Y}_k[Nr/M])$ are separately processed. As shown in FIG. 3, the magnitude $\hat{Y}_k[r]$ is input to stages 304 and 305. At stage 304, the M frames previous magnitude $\hat{Y}_k[r-M]$ is input to stages 305 and 306. At stage 305, the magnitude $\hat{Y}_k[r]$ and $\hat{Y}_k[r-M]$ are received and used to compute the time-varying first-order predictor coefficient $a_k$ as described above in Equations (1) and (8). At stage 306, the product of the previous magnitude $\hat{Y}_k[r-M]$ and the estimated coefficient $\hat{a}_k[r]$ is calculated. At summing junction 307, inverse filtering is performed by subtracting the result of stage 306 from the magnitude $\hat{Y}_k[r]$ to give a filtered magnitude for the STFT domain magnitude signal:

$$\hat{W}_k[r] = \hat{Y}_k[r] - \hat{a}_k[r]\hat{Y}_k[r-M]$$

As explained above, in order to prevent negative values of $\hat{W}_k[r]$ from entering the synthesis filter bank 310, at stage 308, when $\hat{W}_k[r]$ has a negative value, $\hat{W}_k[r]$ is assigned the value zero, and when $\hat{W}_k[r]$ has a positive value, $\hat{W}_k[r]$ is unchanged. At stage 309, a kth complex number is formed by:

$$W_k[Nr/M] = \hat{W}_k[r]\exp(j\arg(\hat{W}_k[r]))$$

where $\hat{W}_k[r] = |W_k[Nr/M]|$ is the magnitude and $\arg(\hat{W}_k[r]) = \arg(\hat{Y}_k[Nr/M])$ is the unchanged argument output at stage 302. The synthesis filter bank 310 receives each of the N complex valued $W_k[Nr/M]$ and performs inverse STFT to obtain the approximate dereverberated digital signal w[n] using $$w[n] = \sum_{r=-\infty}^{\infty} \frac{1}{N} \sum_{k=0}^{N-1} W_k[Nr/M] \exp\left(j\frac{2\pi}{N}kn\right) \quad \text{Equation (9)}$$

It can be shown that if no processing is done so that: $W_k[Nr/M]=Y_k[Nr/M]$, then Equation (9) gives:

$$w[n] = \left(\sum_{r=-\infty}^{\infty} g[Nr/M - n]\right) y[n]$$

Exact reconstruction (i.e., w[n]=y[n]) is achieved if g[n] is a Hanning window and M=4. Alternatively, the inverse STFT can be computed using an inverse Fast Fourier Transform algorithm.

Figure 4:
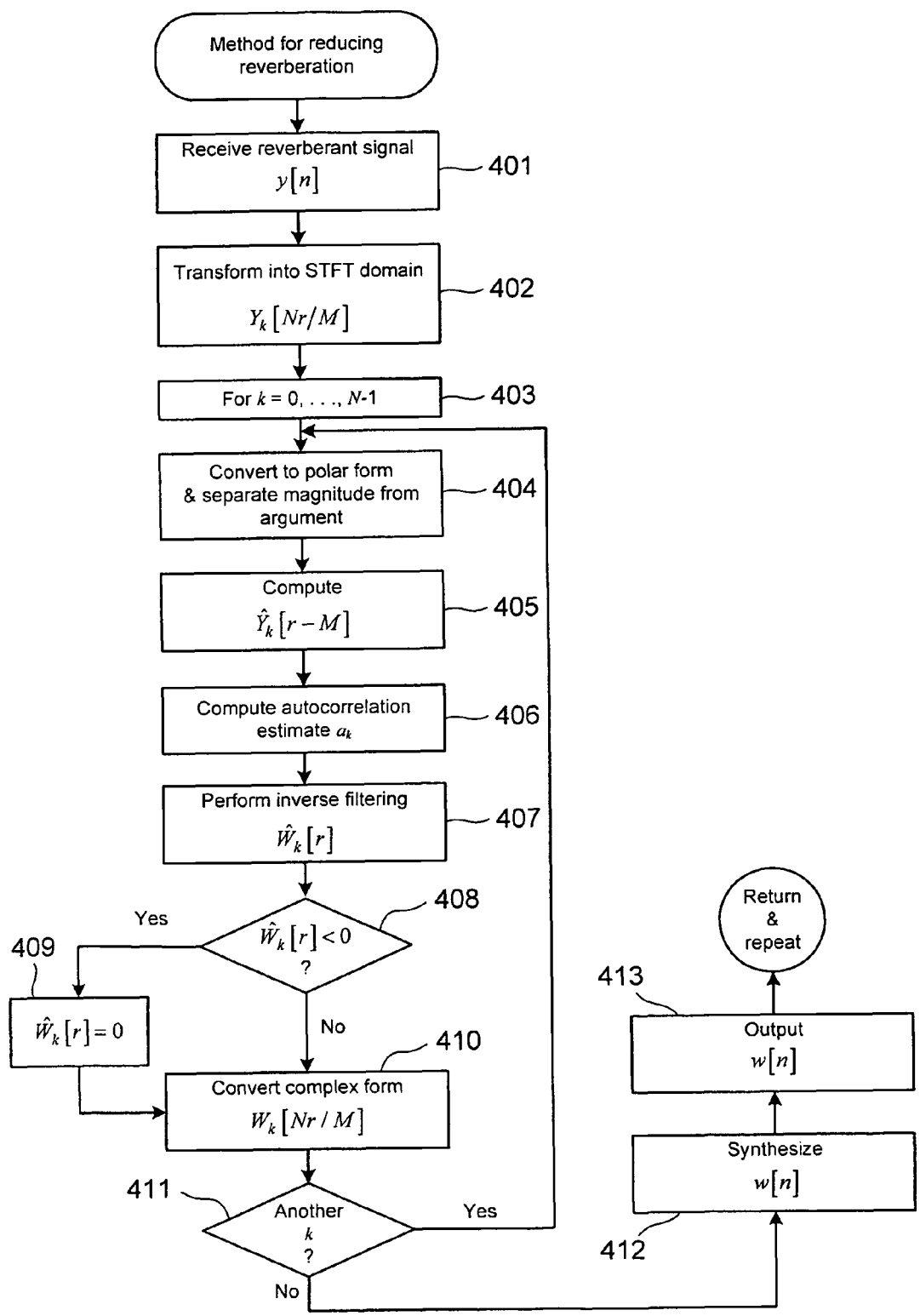
FIG. 4 shows a control-flow diagram of a method for reducing reverberations in digital source signals that can be implemented in software in accordance with embodiments of the present invention.

Method embodiments of the present invention can be implemented in computer software. FIG. 4 shows a control-flow diagram of a method for reducing reverberation in digital source signals that can be implemented in software in accordance with embodiments of the present invention. In step 401, reverberant digital signals y[n] are received. The reverberant digital signals y[n] can be sampled reverberant analog signals generated by a digital microphone in response to sounds collected in a room, as described above with reference to FIG. 1. In step 402, the reverberant signals y[n] are oversampled at M times the critical rate for each of the N subbands and transformed into the STFT domain using an FFT to obtain $Y_k[Nr/M]$ for each of the N subbands, as described above subsection B.2. In the for-loop of step 403, steps 404-410 are repeated for each of the N subbands. In step 404, $Y_k[Nr/M]$ is converted to polar form with the magnitude $\hat{Y}_k[r]=|Y_k[Nr/M]|$ operated on in steps 405-410 and the argument $\arg(Y_k[Nr/M])$ remains unchanged. In step 405, the previous magnitude $\hat{Y}_k[r-M]$ is recovered from memory, where storage of M previous short-time Fourier transforms can be provided. In step 406, the magnitude $\hat{Y}_k[r]$ obtained in step 405 and the previous magnitude $\hat{Y}_k[r-M]$ obtained in step 405 are used to calculate an approximation to the first-order linear prediction coefficient $a_k$, as described above with reference to Equation (8). In step 407, $\hat{Y}_k[r]$ obtained in step 404, $\hat{Y}_k[r-M]$ obtained in step 405, and the $a_k$ obtained in step 406 are used to perform inverse filtering $\hat{W}_k[r]$, as described in Equation (3), to obtain a filter magnitude for the STFT magnitude signal. In step 408, when $\hat{W}_k[r]$ is negative valued, the method proceeds to step 409. Otherwise, the method proceeds to step 410. In step 409, $\hat{W}_k[r]$ is assigned the value zero. In step 410, the argument $\arg(Y_k[Nr/M])$ obtained in step 404 and the magnitude $\hat{W}_k[r]$ are used to form:

$$W_k[Nr/M]=|W_k[Nr/M]|\exp(j\arg(W_k[Nr/M]))$$

where $$\arg(W_k[Nr/M])=\arg(Y_k[Nr/M]) \text{ and } |W_k[Nr/M]|=\hat{W}_k[r]$$

In step 411, when another subband is available, steps 404-410 are repeated. Otherwise, the method proceeds to steps 412. In step 412, the digital signal w[n] is synthesized by computing the inverse FFT with $W_k[Nr/M]$ for all k. In step 413, the approximate dereverberated digital signal w[n] is output.

Figure 5:
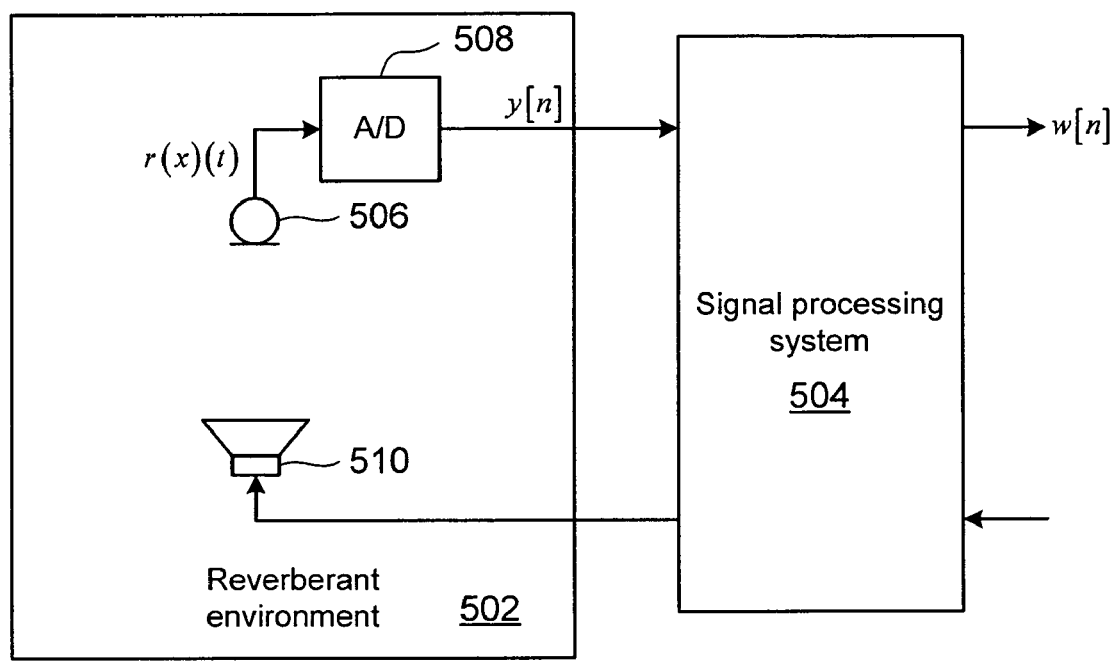
FIG. 5 shows a schematic representation of a reverberant environment and a dereverberation system arranged in accordance with embodiments of the present invention.

FIG. 5 shows a schematic representation of a reverberant environment 502 and a signal processing system 504 arranged in accordance with embodiments of the present invention. The environment 502 can be a room or any other suitable setting for collecting ambient audio. The environment 502 includes a microphone 506 configured to collect ambient audio and convert the ambient audio into electronic analog signals that include reverberation denoted by r(x)(t). The reverberant analog signal r(x)(t) can be passed through an analog-to-digital 508 converter to produce electronic reverberant digital signal y[n] that is sent to the signal processing system 504 for processing. Dereverberation can be performed along with other signal processing methods carried by the system 504, such as noise suppression, microphone array beamforming, acoustic echo cancellation, and other signal processing methods that are suitable for teleconferencing. The system 500 can be located within the reverberant environment 502 or outside the reverberant environment 502 in a separate room or building.

Figure 6:
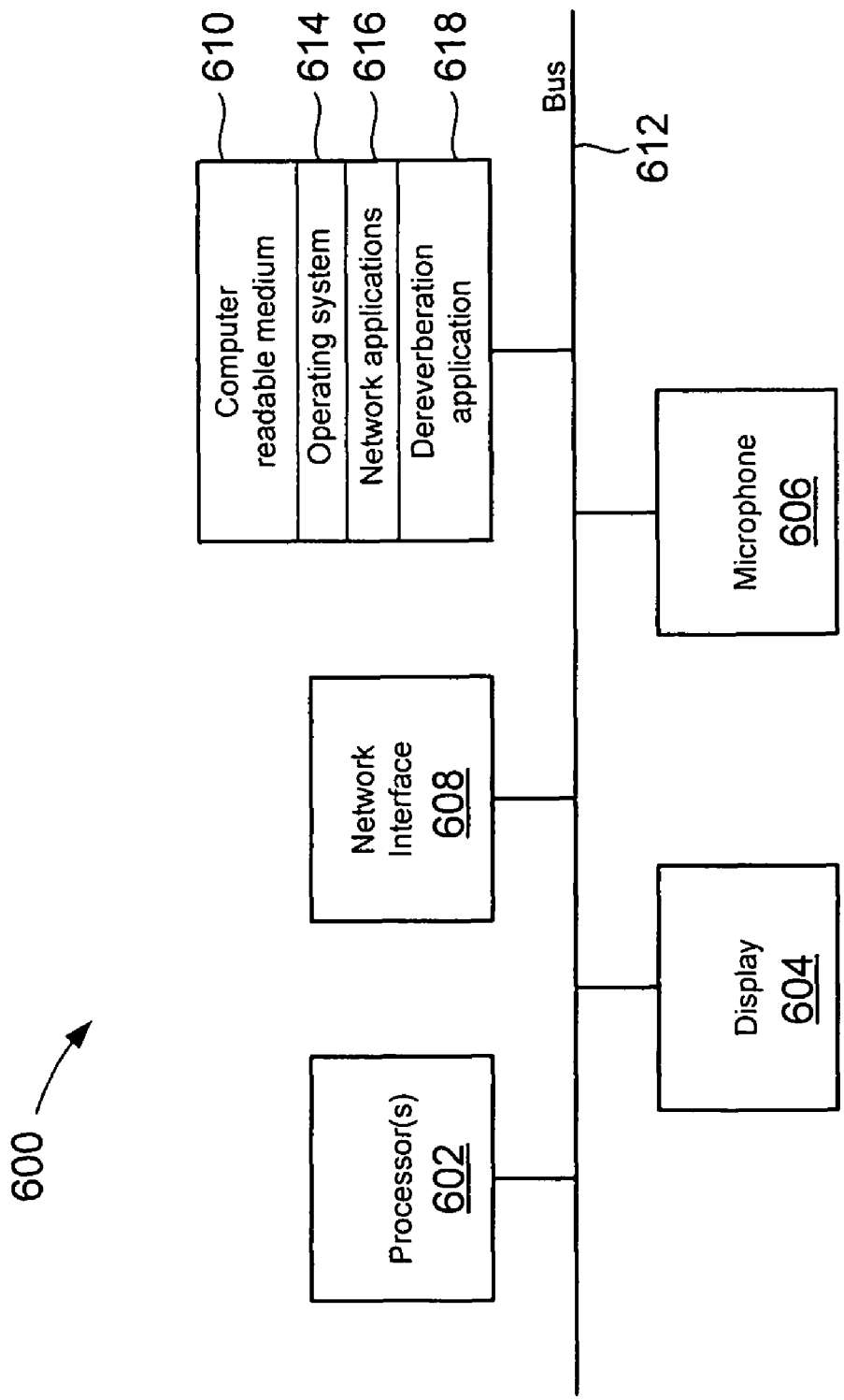
FIG. 6 shows a schematic representation of a computing device configured in accordance with embodiments of the present invention.

In practice, the dereverberation system 504 can be any electronic computing device, including, but not limited to: a desktop computer, a laptop computer, a portable computer, a display system, a personal digital assistant, a handheld electronic device, an embedded electronic device, or an appliance. FIG. 6 shows a schematic representation of a computing device 600 configured in accordance with embodiments of the present invention. The system 600 includes one or more processors 602, such as a central processing unit; optionally one or more display devices 604, such as a monitor; an audio signal interface 606; optionally one or more network interfaces 608, such as Local Area Network LAN, a wireless 802.11x LAN, a 3G mobile WAN or a WiMax WAN; one or more computer-readable mediums 610. Each of these components is operatively coupled to one or more buses 612. For example, the bus 612 can be an EISA, a PCI, a USB, a FireWire, a NuBus, or a PDS. As shown in FIG. 6, the audio interface receives reverberant digital signals y[n] and outputs approximate dereverberated digital signals w[n].

The computer readable medium 610 can be any medium that participates in providing instructions to the processor 602 for execution and storage of data regarding audio signal processing, as described above with reference to FIGS. 3 and 5. For example, the computer readable medium 610 can be non-volatile media, such as an optical or a magnetic disk; volatile media, such as memory; and transmission media, such as coaxial cables, copper wire, and fiber optics. Transmission media can also take the form of acoustic, electromagnetic radiation, or radio frequency waves.

The computer-readable medium 610 may also include an operating system 614, such as Mac OS, Windows, Unix, and Linux; a network communications module 616; and a dereverberation application 618. The operating system 614 can be multi-user, multiprocessing, multitasking, multithreading, real-time and the like. The operating system 614 can also perform basic tasks such as recognizing input from input devices, such as a keyboard or a keypad; sending output to the display 604; keeping track of files and directories on medium 610; controlling peripheral devices, such as disk drives, printers, and the audio signal interface; and managing traffic on the one or more buses 612. The network applications 616 includes various components for establishing and maintaining network connections, such as software for implementing communication protocols including TCP/IP, HTTP, Ethernet, USB, and FireWire. The computer readable medium 610 can also store other software applications, including word processors, browsers, e-mail, Instant Messaging, and media players.

The dereverberation application 618 can be configured to provide various software components for calculating the approximate dereverberated digital signal w[n], as described above with reference to in subsection B.2. In certain embodiments, some or all of the processes performed by the application 618 can be integrated into the operating system 614. In certain embodiments, the processes can be at least partially implemented in digital electronic circuitry, or in computer hardware, firmware, software, or in any combination thereof.

C. Examples

For a sample rate of 48 kHz and N≧4096 the assumptions in Section B.1 provide a good characterization of the behavior of room reverberation, and N=4096 is used in the example to minimize latency. The analysis and synthesis filter banks were realized using 4096-point Hanning-windowed Fast Fourier Transforms (FFTs) with 75% window overlaps, corresponding to M=4. In estimating the $a_k$, $\alpha$=0.99 in Equation (5) is used.

Method embodiments of the present invention were evaluated in a number of reverberant environments typical of teleconferencing systems. Specifically, recordings were made of male and female utterances played back in these environments, and the performance evaluated by comparing the subjective quality to the recorded signal y[n], referenced to the original utterance, to the output w[n] of the dereverberation methods when applied to y[n]. In the experiments, the analysis and synthesis filter banks were realized using 4096-point Hanning-windowed FFTs with 75% overlap (M=4). In estimating the predictor coefficients $a_k$, a value of $\alpha$=0.996 was used for the averages. The subjective quality was scored using ITU-T Rec. P. 862, "Perceptual evaluation of speech quality (PESQ): Objective method for end-to-end speech quality assessment of narrowband telephone networks and speech codecs," International Telecommunications Union, Geneva, Switzerland, 2005. Results from the evaluation are summarized in Table 1 where higher SQValues representing better subjective quality:

TABLE 1

| Room (RT60) | Utterance | SQValue y[n] | SQValue w[n] |
| --- | --- | --- | --- |
| I (0.18 s) | Female | 2.942 | 2.949 |
| II (0.25 s) | Female | 2.831 | 2.844 |
| III (0.42 s) | Female | 2.573 | 2624 |
| IV (0.61 s) | Female | 2.447 | 2.577 |
| V (0.82 s) | Female | 2.371 | 2.570 |
| I (0.18 s) | Male | 3.235 | 3.236 |
| II (0.25 s) | Male | 3.045 | 3.072 |
| III (0.42 s) | Male | 2.754 | 2.891 |
| IV (0.61 s) | Male | 2.611 | 2.785 |
| V (0.82 s) | Male | 2.486 | 2.706 |

According to the results of Table 1, the system achieves a perceived reduction in the effective reverberation time $RT_{60}$ of up to 400 ms, in the sense that the PESQ scores for w[n] in Room V (with $RT_{60}$=0.82 s) are similar to the corresponding scores for y[n] in Room III (with $RT_{60}$=0.42 s).

Figure 7:
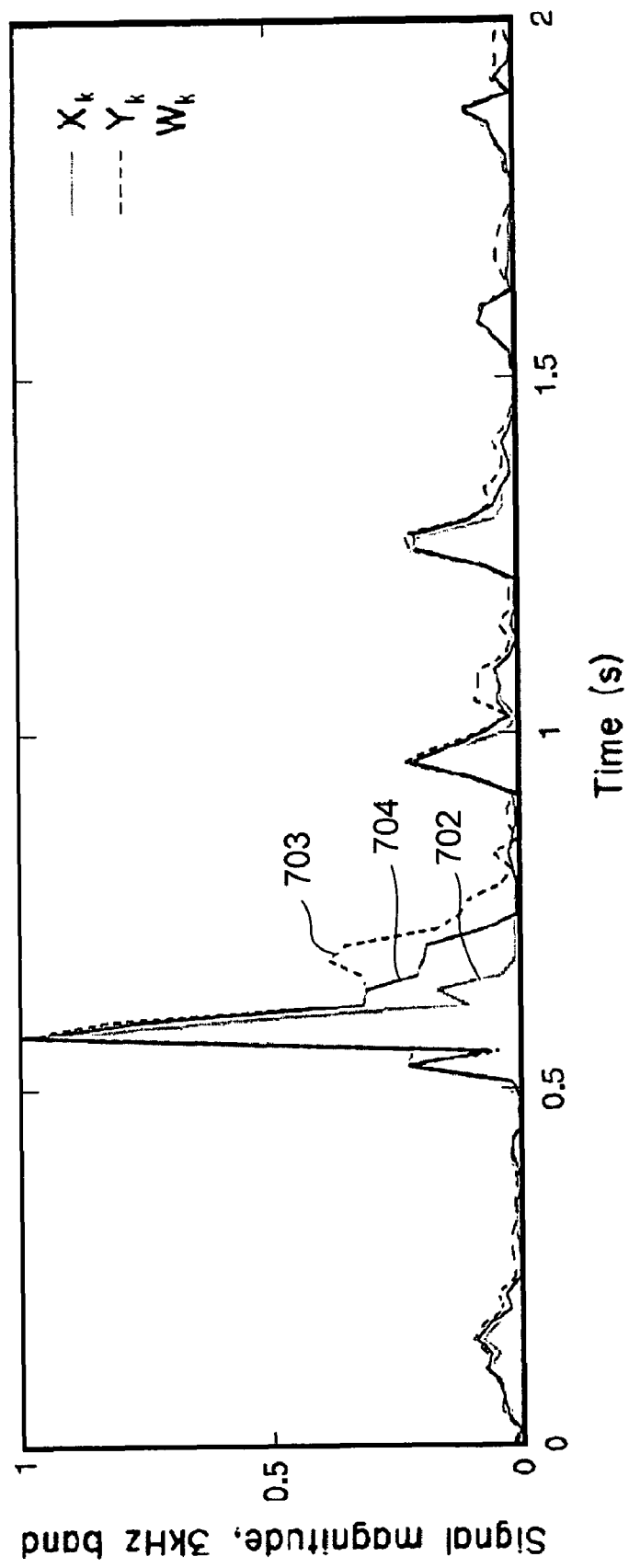
FIG. 7 shows a time series plot corresponding to signals in the 3 kHz band of the short-time Fourier transform domain obtained in accordance with embodiments of the present invention.

FIG. 7 shows time series plots corresponding to signals in the 3 kHz band (k=256) of the STFT domain obtained in accordance with embodiments of the present invention. In particular, FIG. 7 shows magnitude versus time of original time series $|X_k[Nr/M]|$ 702 and simulated reverberant time series $|Y_k[Nr/M]|$ 703 together with dereverberated time series $|W_k[Nr/M]|$ 704. Observe that the reverberant signal $|Y_k[Nr/M]|$ 703 appears to be "smeared" to the right (later in time) consistent with the first order convolutional model. The processed signal in FIG. 7 shows that the smearing is partially overcome by inverse filtering.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for dereverberating digital source signals using a computing device, the method comprising:
  transforming a reverberant digital signal into Fourier domain signals using the computing device, each Fourier domain signal corresponding to a subband;
  for each subband,
    computing first or higher order autoregressive model coefficients of the reverberation with current and previous magnitudes of the Fourier domain signal, and
    inverse filtering a magnitude of the Fourier domain signal based on the autoregressive model coefficients and previous magnitudes of the Fourier domain signal;
  inverse transforming the Fourier domain signals with filtered magnitudes to obtain an approximate dereverberated digital signal;
  wherein inverse filtering the magnitude of the Fourier domain signal further comprising computing:

$$\hat{W}_k[r] = \hat{Y}_k[r] - \hat{a}_k[r]\hat{Y}_k[r-M]$$

where
  $\hat{W}_k[r]$ is the filtered magnitude of the Fourier domain signal,
  $\hat{Y}_k[r]$ is the magnitude of the Fourier domain signal,
  $\hat{Y}_k[r-M]$ is the magnitude of a previous Fourier domain signal, and
  $\hat{a}_k[r]$ is the approximate model coefficient.

2. The method of claim 1 further comprising, for each subband converting the Fourier domain signal into polar form.

3. The method of claim 1 wherein transforming the reverberant digital signal from the time domain into Fourier domain signals further comprises applying a short-time Fourier transform on the reverberant digital signal.

4. The method of claim 1 wherein transforming the reverberant digital signal from the time domain into Fourier domain signals further comprises critically and over sampling the subbands.

5. The method of claim 1 wherein computing the autoregressive model coefficients further comprises computing an autocovariance approximation of the magnitudes as follows:

$$\hat{a}_k[r] = \frac{\hat{a}_k^{(num)}[r]}{\hat{a}_k^{(den)}[r]}$$

where $$\hat{a}_k^{(num)}[r] = \alpha\hat{a}_k^{(num)}[r-1] + (1-\alpha)(\hat{Y}_k[r] - \hat{\mu}_{\hat{Y}_k}[r])(\hat{Y}_k[r-M] - \hat{\mu}_{\hat{Y}_k}[r]),$$

$$\hat{a}_k^{(den)}[r] = \alpha\hat{a}_k^{(den)}[r-1] + (1-\alpha)(\hat{Y}_k[r] - \hat{\mu}_{\hat{Y}_k}[r])^2,$$

$\hat{Y}_k[r]$ is the magnitude of the Fourier domain signal,
$\hat{Y}_k[r-M]$ is the magnitude of a previous Fourier domain signal
$\hat{\mu}_{\hat{Y}_k}[r]=\alpha\hat{\mu}_{\hat{Y}_k}[r-1]+(1-\alpha)\hat{Y}_k[r]$, and
$\alpha$ is a parameter that determines the rate at which the estimates of the $a_k$ are allowed to adapt.

6. A non-transitory computer readable medium having instructions thereon which, when executed by a computing device, dereverberate a reverberant digital signal into an approximate dereverberated digital signal, the instructions comprising instructions to:
transform a reverberant digital signal into short-time Fourier domain signals, each Fourier domain signal corresponding to a subband;
for each subband:
compute at least first order autoregressive model coefficients of the reverberation with current and previous magnitudes of the Fourier domain signal; and
inverse filter a magnitude of the Fourier domain signal based on the autoregressive model coefficients and previous magnitudes of the Fourier domain signal; and
inverse transform the Fourier domain signals with filtered magnitudes to obtain an approximate dereverberated digital signal;
wherein to inverse filter the magnitude of the Fourier domain signal, the instructions cause the computer device to compute:

$$\hat{W}_k[r]=\hat{Y}_k[r]-\hat{a}_k[r]\hat{Y}_k[r-M]$$

where
$\hat{W}_k[r]$ is the filtered magnitude of the Fourier domain signal,
$\hat{Y}_k[r]$ is the magnitude of the Fourier domain signal,
$\hat{Y}_k[r-M]$ is the magnitude of a previous Fourier domain signal, and
$\hat{a}_k[r]$ is the approximate model coefficient.

7. The non-transitory computer readable medium of claim 6, wherein the instructions to cause the computer device to compute the at least first order autoregressive model coefficients of the reverberation further comprise instructions to cause the computer device to compute an autocovariance approximation of the current and previous magnitudes as follows:

$$\hat{a}_k[r] = \frac{\hat{a}_k^{(num)}[r]}{\hat{a}_k^{(den)}[r]}$$

where $$\hat{a}_k^{(num)}[r]=\alpha\hat{a}_k^{(num)}[r-1]+(1-\alpha)(\hat{Y}_k[r]-\hat{\mu}_{\hat{Y}_k}[r])(\hat{Y}_k[r-M]-\hat{\mu}_{\hat{Y}_k}[r]),$$

$$\hat{a}_k^{(den)}[r]=\alpha\hat{a}_k^{(den)}[r-1]+(1-\alpha)(\hat{Y}_k[r]-\hat{\mu}_{\hat{Y}_k}[r])^2,$$

$\hat{Y}_k[r]$ is the magnitude of the Fourier domain signal,
$\hat{Y}_k[r-M]$ is the magnitude of a previous Fourier domain signal
$\hat{\mu}_{\hat{Y}_k}[r]=\alpha\hat{\mu}_{\hat{Y}_k}[r-1]+(1-\alpha)\hat{Y}_k[r]$, and
$\alpha$ is a parameter that determines the rate at which the estimates of the $a_k$ are allowed to adapt.

8. A system to dereverberate a reverberant digital signal into an approximate dereverberated digital signal, comprising:
one or more computer processors; and
a memory, encoded thereon computer instructions directing the one or more computer processors to:
transform a reverberant digital signal into short-time Fourier domain signals, each Fourier domain signal corresponding to a subband;
for each subband:
compute at least first order autoregressive model coefficients of the reverberation with current and previous magnitudes of the Fourier domain signal; and
inverse filter a magnitude of the Fourier domain signal based on the autoregressive model coefficients and previous magnitudes of the Fourier domain signal; and
inverse transform the Fourier domain signals with filtered magnitudes to obtain an approximate dereverberated digital signal;
wherein to inverse filter the magnitude of the Fourier domain signal, the instructions cause the computer device to compute:

$$\hat{W}_k[r]=\hat{Y}_k[r]-\hat{a}_k[r]\hat{Y}_k[r-M]$$

where
$\hat{W}_k[r]$ is the filtered magnitude of the Fourier domain signal,
$\hat{Y}_k[r]$ is the magnitude of the Fourier domain signal,
$\hat{Y}_k[r-M]$ is the magnitude of a previous Fourier domain signal, and
$\hat{a}_k[r]$ is the approximate model coefficient.

9. The system of claim 8 wherein the instructions to cause the one or more computer processors to compute the at least first order autoregressive model coefficients of the reverberation further cause the one or more computer processors to compute an autocovariance approximation of the current and previous magnitudes as follows:

$$\hat{a}_k[r] = \frac{\hat{a}_k^{(num)}[r]}{\hat{a}_k^{(den)}[r]}$$

where $$\hat{a}_k^{(num)}[r]=\alpha\hat{a}_k^{(num)}[r-1]+(1-\alpha)(\hat{Y}_k[r]-\hat{\mu}_{\hat{Y}_k}[r])(\hat{Y}_k[r-M]-\hat{\mu}_{\hat{Y}_k}[r]),$$

$$\hat{a}_k^{(den)}[r]=\alpha\hat{a}_k^{(den)}[r-1]+(1-\alpha)(\hat{Y}_k[r]-\hat{\mu}_{\hat{Y}_k}[r])^2,$$

$\hat{Y}_k[r]$ is the magnitude of the Fourier domain signal,
$\hat{Y}_k[r-M]$ is the magnitude of a previous Fourier domain signal
$\hat{\mu}_{\hat{Y}_k}[r]=\alpha\hat{\mu}_{\hat{Y}_k}[r-1]+(1-\alpha)\hat{Y}_k[r]$, and
$\alpha$ is a parameter that determines the rate at which the estimates of the $a_k$ are allowed to adapt.

* * * * *

UNITED STATES PATENT AND TRADEMARK OFFICE
CERTIFICATE OF CORRECTION

PATENT NO. : 8,218,780 B2  
APPLICATION NO. : 12/484686  
DATED : July 10, 2012  
INVENTOR(S) : Thomas Anthony Baran et al.

Page 1 of 1

It is certified that error appears in the above-identified patent and that said Letters Patent is hereby corrected as shown below:

In column 10, line 43, in Claim 1, delete "$â_k\ [r]$" and insert -- $â_k[r]$ --, therefor.

In column 11, line 35, in Claim 6, delete "$â_k\ [r]$" and insert -- $â_k[r]$ --, therefor.

In column 12, line 34, in Claim 8, delete "$â_k\ [r]$" and insert -- $â_k[r]$ --, therefor.

Signed and Sealed this  
Twenty-ninth Day of January, 2013

David J. Kappos  
*Director of the United States Patent and Trademark Office*